UNITED STATES PATENT OFFICE.

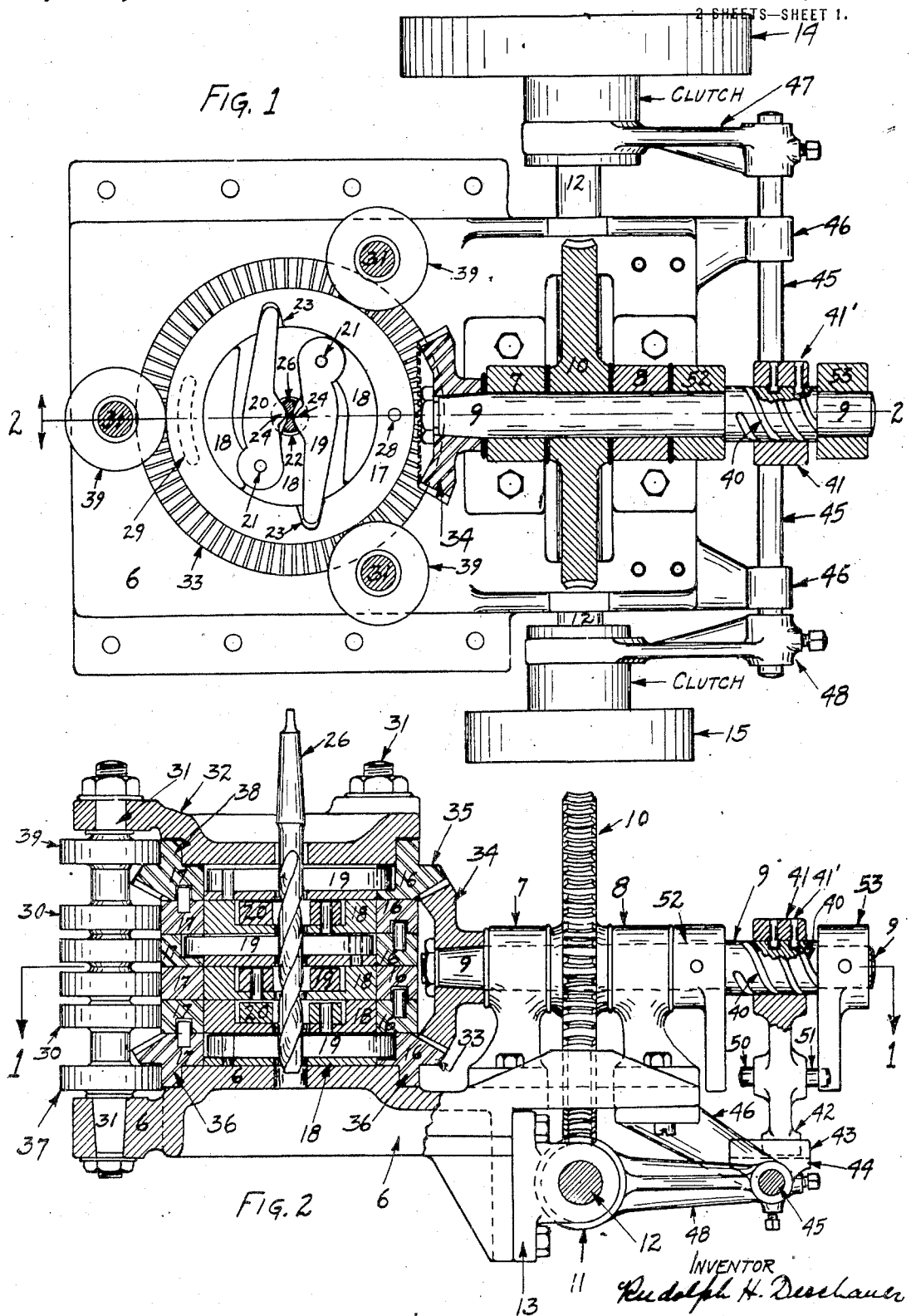

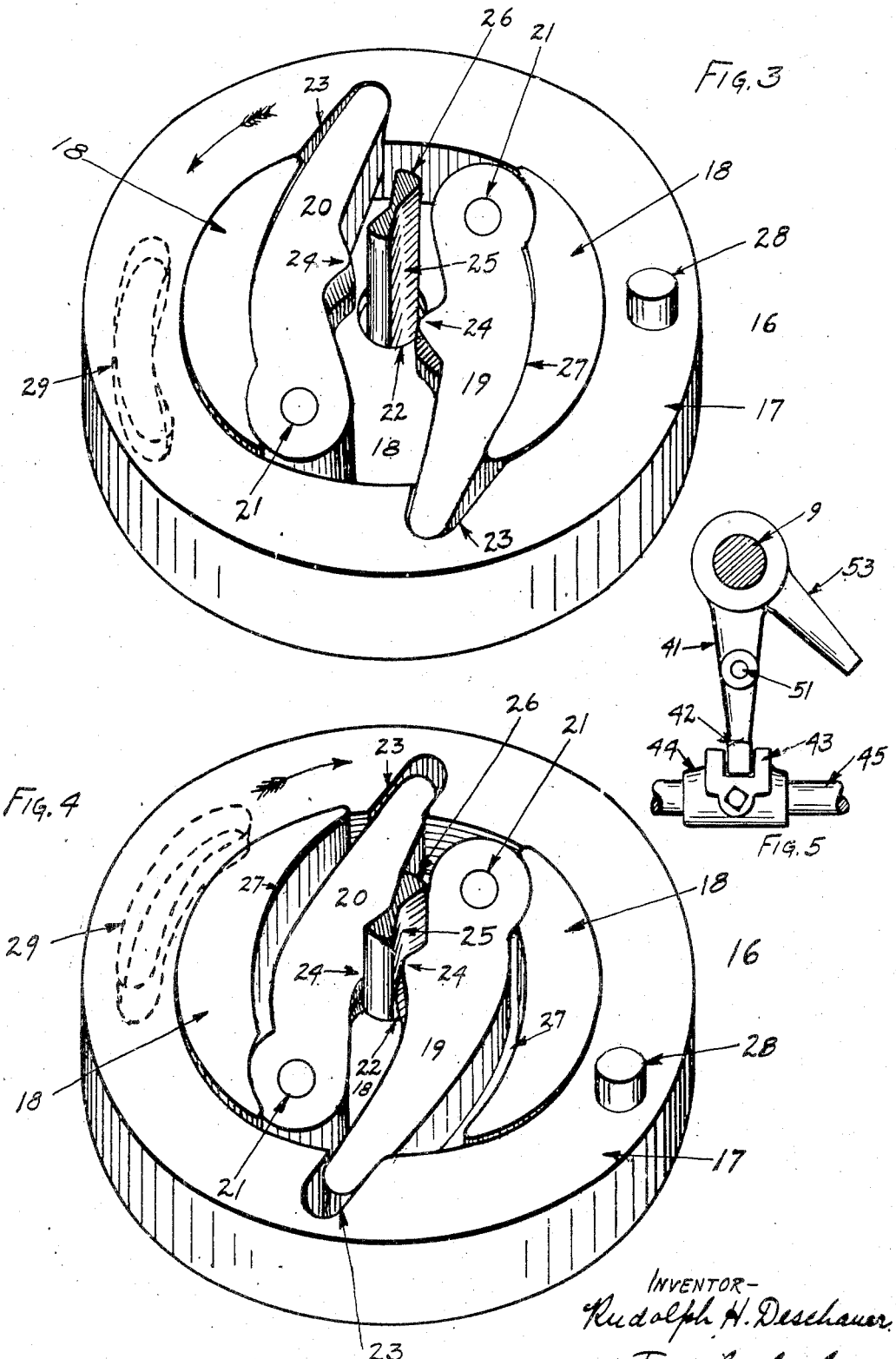

RUDOLPH H. DESCHAUER, OF CHICAGO, ILLINOIS.

MACHINE FOR MAKING TWIST-DRILLS.

1,341,636.   Specification of Letters Patent.   Patented June 1, 1920.

Application filed May 29, 1919. Serial No. 300,662.

*To all whom it may concern:*

Be it known that I, RUDOLPH H. DE-SCHAUER, a citizen of the United States, and a resident of Chicago, in the county of Cook and State of Illinois, have invented certain new and useful Improvements in Machines for Making Twist-Drills, of which the following is a full, clear, and exact description.

The invention relates to machines for twisting drills.

One object of the present invention is to provide an improved machine in which the twisting devices may be released from the twisted drill so that it will fall out of the machine.

A still further object of the invention is to provide a power-driven machine in which provision is made for driving the twisting devices in opposite directions so that they will be driven by power in one direction to twist the drill and by power in the opposite direction to release the drill.

Another object of the invention is to provide a power-driven machine for twisting drills in which provision is made for automatically stopping the machine when the drill-stock has been sufficiently twisted and when the twisting-devices are reversely operated to release the twisted drill.

The invention consists in the several novel features hereinafter set forth and more particularly defined by claims at the conclusion hereof.

In the drawings: Figure 1 is a horizontal section taken on line 1—1 of Fig. 2. Fig. 2 is a section taken on line 2—2 of Fig. 1. Fig. 3 is a perspective of one of the twisting devices, the gripper-levers being shown in position to release the twisted drill. Fig. 4 is a similar view showing the gripper-levers in operative position. Fig. 5 is a detail of the shifting mechanism for the clutch-controlling shaft.

The machine comprises a suitable frame or base 6 upon which are mounted bearings 7 and 8 for a shaft 9 to which is secured a worm-gear 10 which is adapted to be driven by a worm 11 on a shaft 12 which is mounted in bearings 13 which are secured to one end of the frame. Worm-shaft 12 is adapted to be driven by a pulley 14, containing a clutch (not shown) of suitable and usual construction, in that direction which will operate the twisting devices to twist the drill-stock. A pulley 15 is adapted to drive the worm-shaft through a suitable clutch (not shown) in reverse direction to restore the gripping devices to their normal position and to release the twisted drill.

The machine comprises a superimposed series of twisting devices 16 similar in construction and which are connected for a limited relative movement. Each twisting-device comprises a drive-ring 17, a head 18 fitting in and rotatable in the ring and a pair of work-gripping levers 19 and 20 disposed on opposite sides of the center and respectively pivoted to oppositely disposed pins 21 carried by the head. The bottom of each head is provided with an opening 22 of sufficient size to receive the stock to be twisted and to permit the twisted drill to pass through the head. Each of the gripper-levers 19 and 20 has one end extended into a notch 23 in the ring 17 and is provided with a suitable jaw or point 24 which is adapted to enter a groove 25 in the drill-stock 26. The gripper-levers 19 and 20 are disposed in a recess 27 formed in the head 18. Each ring is provided with a stud 28 extending into an arcuate groove 29 into the contiguous ring of the series and these studs and grooves constitute lost-motion connections between the rings by which each ring will be operated to twist a portion of the stock and when the lost-motion between two adjacent rings is taken up to rotate the next ring and so on until the twisting devices have been successively operated to twist all portions of the stock.

The rings 16 are rotatably guided and kept alined by rollers 30 on fixed vertical shafts 31. A top-plate 32 is sustained by shafts 31 from the frame 6. The lower ring 16 is formed with beveled gear-teeth 33 which mesh with a beveled gear 34 on the inner end of shaft 9 and the upper ring 16 is provided with a gear-ring 35 which also meshes with the gear 34. A flange 36 is formed on the lowermost gear-ring and is guided by rollers 37 on shaft 31 and the uppermost ring 16 is provided with a flange 38 which is guided by rollers 39 on shafts 31.

A helical groove 40 is formed adjacent the outer end of shaft 9 and an arm 41 is operated longitudinally of the shaft by studs 41′ carried thereby and extending into said groove. The lower end 42 of this arm extends into a groove 43 in a collar 44 which is secured to a controller-shaft 45. This shaft is slidably supported in bearings 46 carried by the frame 6. A clutch-controlling arm 47 for the pulley 14 is secured to one end of shaft 45 and a clutch-controlling arm 48 for the pulley 15 is secured to the other end of shaft 45. Arm 41 is provided with projecting studs 50 and 51, one of which is adapted to pass into the path of an arm 52 fixed to and rotating with shaft 9, and the other of which is movable into the path of, and adapted to be shifted by, an arm 53 which is also fixed to and rotates with the shaft 9. These arms, in their rotation, strike studs 50 and 51 respectively, and swing arm 41 to operate collar 44 and the shaft 45 longitudinally to throw out the clutches for the pulleys 14 and 15 respectively.

The operation of the machine will be as follows: The stock 26 to be twisted will be dropped into position in holes 22 while all the gripper-jaws 19 and 20 are separated, as shown in Fig. 3. The operator will cause the belt-pulley 14 to be driven to drive the beveled gear 34 through shaft 12, worm 11, worm-gear 10 and shaft 9. Gear 34 will rotate the gears 35 and 33 on the uppermost and lowermost twisting devices in opposite directions. The operation of these rings by the pulley 14 will cause them to be relatively operated in that direction which will cause the stock 26 to be twisted in desired direction. When the gripper-jaws are spread and during the initial movement of each ring in the direction indicated by the arrow in Fig. 4, the gripper-levers 19 and 20 will be operated about their respective pivots on the head 18 until the jaws 24 enter the grooves in the stock and engage the stock 26, and thereafter each ring, head and levers carried thereby will move in unison to twist the drill. The upper and lower rings will rotate independently of the rings contiguous thereto until the pins 28 encounter the ends of the slots 29 in the contiguous rings, and thereafter the contiguous rings will move in unison with the first driven rings and so on until all of the lost-motion between the rings has been taken up, at which time the stock will have been twisted as desired. When the twisting operation by all of the twisting devices of the series has been completed, the stud 50 on arm 41 will be struck by the arm 52 to shift the arm 41 to cause the clutch between pulley 14 and shaft 12 to be released and thus automatically stop the twisting operation. Next, the operator will render shaft 12 operative by pulley 15 to impart reverse rotation to the twisting devices. During this reverse rotation, the rings 16 will be successively operated through the stud and groove connections 28 and 29, and each ring will initially move independently of its head and withdraw the jaws 24 from the helical grooves in the drill and into position shown in Fig. 3. After all the jaws 24 have been released and the rings reversely rotated, the jaws will entirely clear the twisted drill, so that when it is released, it will be free to drop from the gripping-devices. When the releasing operation has been completed, the arm 53 will strike the stud 51 on arm 41 and operate the latter to release the clutch between the pulley 15 and shaft 12 and thus automatically stop the machine at the end of a releasing or resetting operation.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine for twisting drills, the combination of a series of rotatable twisting-devices, each comprising a driving member and jaws for gripping the stock movable relatively to and rotated by the driving member so the jaws can be withdrawn to clear the stock after it has been twisted, and a connection between the member and the jaws for shifting the latter into and out of operative position by rotation of the member.

2. In a machine for twisting drills, the combination of a series of rotatable twisting-devices, each comprising a driving ring and levers having jaws for gripping the stock movable relatively to and rotatable by the driving members so the levers can be withdrawn to clear the stock after it has been twisted, and a connection between the levers and the ring for shifting the jaws into and out of operative position.

3. In a machine for twisting drills, the combination of a series of rotatable twisting devices, each comprising a driving ring and jaws for gripping the stock movable relatively to and operated by the ring so they can be withdrawn to clear the stock after it has been twisted, a connection between the ring and the jaws for shifting the jaws into and out of operative position by rotation of the ring, and driving mechanism and lost motion connections between the rings.

4. In a machine for twisting drills, the combination of a series of rotatable twisting devices, each comprising a ring, a head in and movable relatively to the ring and levers having jaws for gripping the stock and pivoted in the head and engaged by the ring, and mechanism for rotating the ring.

5. In a machine for twisting drills, the combination of a series of rotatable twisting devices, each comprising a ring, a head in and movable relatively to the ring and jaws pivoted in the head for gripping the stock between the head and the ring, and mechanism for rotating the ring.

6. In a machine for twisting drills, the combination of a series of rotatable twisting devices, each comprising a driving ring, a head in the ring, and levers pivoted in the head having jaws for gripping the stock and operated by the ring, and mechanism for rotating the rings.

7. In a machine for twisting drills, the combination of a series of rotatable twisting devices, each comprising a driving member and gripping-jaws relatively movable to and operated by the driving member and power-driven mechanism for rotating the devices to twist the stock, and for reversely driving the members to release the jaws from the twisted stock, said devices comprising connections between the driving members and the gripping jaws for shifting the jaws into and out of operative position, operable by the power driven mechanism.

8. In a machine for twisting drills, the combination of a series of rotatable twisting devices, each comprising a driving ring, a head in said ring, and gripping-levers between the ring and the head, and power-driven mechanism for rotating the driving mechanism to twist the stock, and for reversely driving the members to release the jaws from the twisted stock, said devices comprising connections between the driving rings and the levers for shifting the jaws into and out of operative position, operable by the power driven mechanism.

9. In a machine for twisting drills, the combination of a series of rotatable twisting devices, each comprising a driving member and a gripping member relatively movable to and operated by the driving member, lost-motion connections between the driving members, and power-driven mechanism for rotating the driving mechanism to twist the stock and for reversely driving the members to release the jaws from the twisted stock, said devices comprising connections between the driving members and the gripping members to shift the jaws into and out of operative position, operable by the power driven mechanism.

10. In a machine for twisting drills, the combination of a series of rotatable twisting devices, lost-motion driving connections between said devices, mechanism for driving the devices, and means for automatically stopping said mechanism when the stock has been twisted.

11. In a machine for twisting drills, the combination of a series of rotatable twisting devices, each comprising a ring and a pair of jaws movable relatively to and rotated by said ring, lost-motion driving connections between said devices, mechanism for driving the devices, and mechanism for automatically stopping said mechanism when the stock has been twisted.

12. In a machine for twisting drills, the combination of a series of rotatable twisting devices, driving connections between said devices, mechanism for rotating said devices to twist the stock and to reversely rotate said devices to withdraw them from engagement with the stock, and automatic stop-means for said mechanism.

13. In a machine for twisting drills, the combination of a series of rotatable twisting devices, each comprising a ring and a pair of jaws movable relatively to and rotated by the ring, lost-motion driving connections between said devices, mechanism for driving said devices to twist the stock and to reversely rotate said devices to withdraw them from engagement with the stock, and automatic stop-means for said mechanism.

14. In a machine for twisting drills, the combination of a series of rotatable twisting devices, each comprising a driving ring and gripping jaws relatively movable to and operated by the driving ring, power-driven mechanism for rotating the rings to twist the stock and peripheral guides for the rings.

RUDOLPH H. DESCHAUER.